United States Patent [19]
Blake et al.

[11] Patent Number: 6,164,138
[45] Date of Patent: *Dec. 26, 2000

[54] SELF ALIGNING DIAL FOR INSTRUMENT GAUGE

[75] Inventors: Jeffrey T. Blake, Milford; Talivaldis I. Maidelis, Cheshire, both of Conn.

[73] Assignee: Dresser Industries, Inc., Dallas, Tex.

[*] Notice: This patent issued on a continued prosecution application filed under 37 CFR 1.53(d), and is subject to the twenty year patent term provisions of 35 U.S.C. 154(a)(2).

[21] Appl. No.: 09/052,597

[22] Filed: Mar. 31, 1998

Related U.S. Application Data

[60] Provisional application No. 60/043,350, Apr. 15, 1997.

[51] Int. Cl.$^7$ .................................. G01L 7/04; G01L 7/08
[52] U.S. Cl. ............................................................. 73/732
[58] Field of Search .............................. 73/700, 715, 431, 73/866.3, 732, 146.5, 741, 740, 756; 324/156; 361/600; 29/509, 525.05, 525.07; 156/91, 308.4, 309.6; 33/172

[56] References Cited

U.S. PATENT DOCUMENTS

| | | | |
|---|---|---|---|
| 2,565,526 | 8/1951 | Seitz | 73/714 |
| 2,773,388 | 12/1956 | Prosser | 73/431 |
| 4,107,996 | 8/1978 | Hollingsworth et al. | 73/300 |
| 4,305,667 | 12/1981 | Nachtrieb | 356/397 |
| 4,528,755 | 7/1985 | Kanda et al. | 33/172 R |
| 5,567,883 | 10/1996 | Nara et al. | 73/741 |
| 5,650,566 | 7/1997 | Chou | 73/431 |
| 5,970,796 | 8/1999 | Bake et al. | 73/741 |

Primary Examiner—Benjamin R. Fuller
Assistant Examiner—Abdullahi Aw-Musse
Attorney, Agent, or Firm—Daniel Rubin

[57] ABSTRACT

There is disclosed a pressure gauge construction in which the dial plate includes recessed indentations interfit with pins projecting beyond the front face of the gauge movement for supporting a dial plate in place. An adhesive cement is contained between the back face of the dial plate and the front face of the movement effects an adhesive bonding therebetween.

5 Claims, 3 Drawing Sheets

SELF ALIGNING DIAL FOR INSTRUMENT GAUGE

This application claims the benefit of prior filed co-pending U.S. Provisional Application Ser. No. 60/043,350 filed Apr. 15, 1997.

FIELD OF THE INVENTION

The field of art to which the invention pertains includes the art of pressure gauges for the monitoring of pressure fluid and of a type in which an expandable diaphragm comprises the pressure sensing element.

BACKGROUND OF THE INVENTION

Pressure gauges are widely utilized in a myriad of different environments for commercial and industrial applications where measuring an indication of fluid pressure values is required. Values of pressure are usually displayed by a displaceable pointer opposite a dial plate containing graduations of pressure indicia. The gauge typically utilizes a pressure-sensitive element and incurs a predictable displacement in response to pressure changes to which it is exposed. The displacement is then translated via a movement or amplifier leading directly to the pointer that is displaced opposite the dial plate.

In a typical diaphragm-type pressure gauge, the dial plate is secured internally of the casing by fasteners, as disclosed for example, in U.S. Pat. No. 5,181,422 incorporated herein by reference. The diaphragm assembly is then mounted in an enclosure using hardware such as screws, rivets, welding, etc. Other forms of diaphragm constructions are disclosed, for example, in U.S. Pat. Nos. 1,572,970; 3,844,025; and 4,488,341.

While such prior dial installations have functioned well, they have long been regarded as being too labor intensive and incurring costs beyond what would appear to be merited.

Despite recognition of the foregoing, a much simpler and more economically feasible approach to effect a reliable, inexpensive, and simple installation of the dial plate, that eliminates the need for fasteners has not heretofore been known.

OBJECTS OF THE INVENTION

It is therefore an object of the invention to provide a novel construction for installation of the dial plate in pressure gauge.

It is a further object of the invention to effect the previous object with a construction requiring less labor intensity than heretofore as to result in a lower product manufacturing cost.

It is a still further object of the invention to effect the previous objects with a construction that results in a high level of reliability over the life expectancy of the gauge.

SUMMARY OF THE INVENTION

This invention relates to pressure gauge apparatus, including an expandable diaphragm as the pressure-sensitive element. More specifically, the invention relates to such a pressure gauge in which the dial plate is readily secured in place without the use of hardware in the manner of the prior art.

The foregoing is achieved herewith by means of a gauge construction utilizing a single diaphragm capsule attached internally of the gauge case in a pressure-tight relation surrounding an internal outlet aperture in the casing. Fluid pressure is communicated to the diaphragm capsule from an exterior stem. For installing the capsule assembly, the gauge case is provided with a plurality of angularly displaced laterally extending posts on which to receive and support the capsule assembly. Supported about the front of the capsule assembly is a movement by which diaphragm displacement is transmitted to a displaceable pointer opposite a dial plate. The dial plate includes a span of pressure graduations with which the pointer displaceably registers to provide an indication of pressure value of fluid being received by the gauge.

In accordance herewith, the annular dial plate is fabricated having a pair of partial lances effecting recessed projections at predetermined symmetrically radial locations on the front face of the dial plate. The front face of the movement includes a vertical plate through which the ends of laterally staked pins protrude at spacings coinciding with the projection recesses in the dial plate. The pins interfitting the recesses align and locate the dial plate on the movement. Once located, an adhesive cement secures and bonds the back of the dial plate to the vertical plate of the movement.

As a consequence of the foregoing, a reliable, less expensive and simple construction is utilized to secure the dial plate in a manner at least as effective as screw fasteners without the attendant expense thereof.

The above noted features and advantages of the invention, as well as other superior aspects thereof, will be appreciated by those skilled in the art upon reading the detailed description that follows in conjunction with the drawings.

DESCRIPTION OF THE PREFERRED EMBODIMENT

Figure 1:
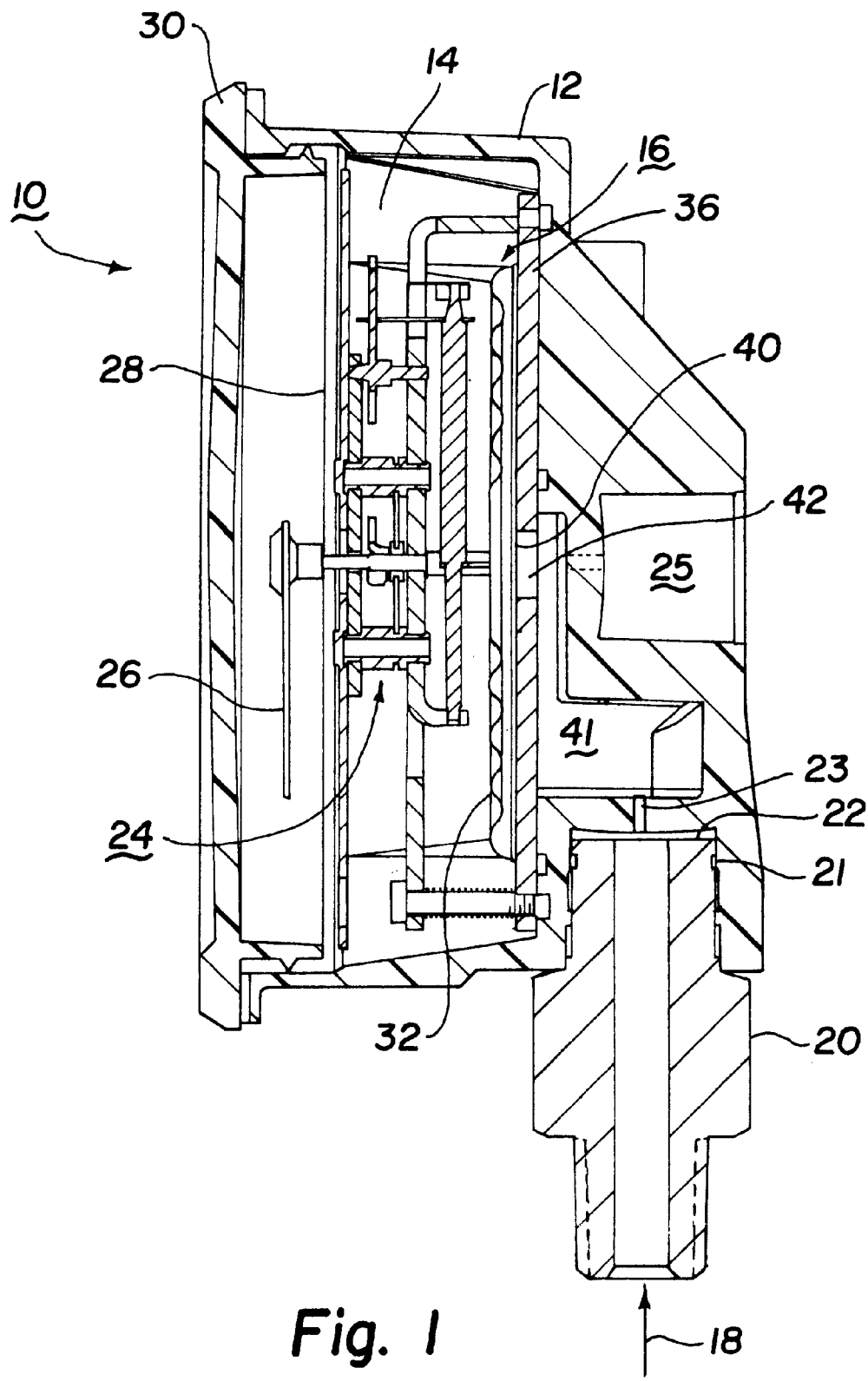
FIG. 1 is a side elevation partially sectioned of a pressure gauge in accordance with the invention hereof.

In the description which follows, like parts are marked throughout the specification and drawings with the same reference numerals, respectively. Drawing figures are not necessarily to scale and in certain views, parts may have been exaggerated for purposes of clarity.

Referring now to the drawings, there is illustrated in FIG. 1 a pressure gauge designated 10 comprising a casing 12 for enclosing operating components to be described. The casing is preferably formed of injection molded glass-filled polysulfone (PSU). Within cavity 14 of the casing there is secured a diaphragm assembly 16 into which fluid pressure 18 is communicated via vertical stem 20 (or optionally to a rear stem not shown in socket 25) secured pressure-tight via gasket 21 to socket 22. With a stem 20 in a selected socket, an aperture 23 is drilled through the casing wall thereat to communicate inward thereof to outlet 43 exposed to cavity 14. Operative displacement of the diaphragm in response to changes in pressure values of the received fluid at outlet 43 effects lateral displacement of the diaphragm that via a movement 24 causes arcuate displacement of pointer 26 opposite a graduated dial plate 28 as will be described. A glass containing bezel 30 secured about the front peripheral edges of the casing affords clear viewing of the pointer position relative to dial plate 28.

Figure 2:
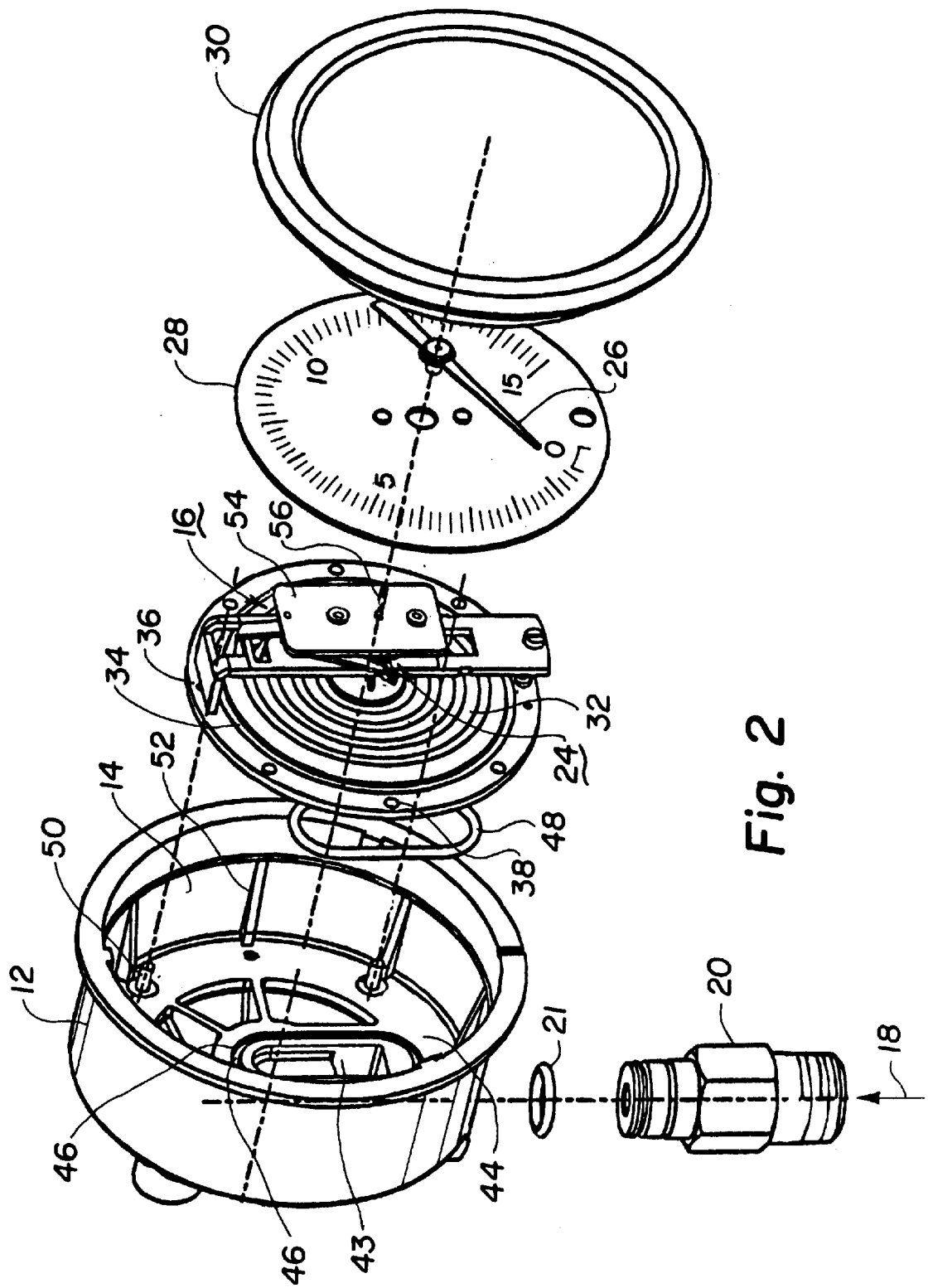
FIG. 2 is a an exploded isometric view of the pressure gauge of FIG. 1.
Figure 3:
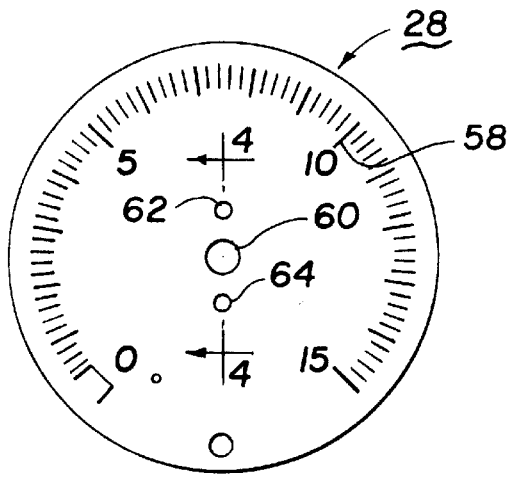
FIG. 3 is a sectional front elevation of the dial plate hereof.
Figure 4:
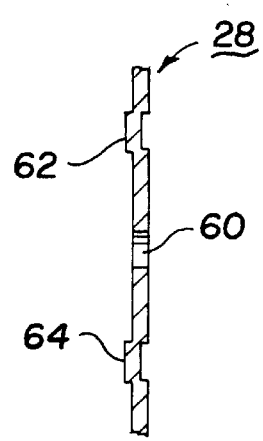
FIG. 4 is a fragmentary and enlarged sectional elevation as seen substantially along the lines 4—4 of FIG. 3.
Figure 5:
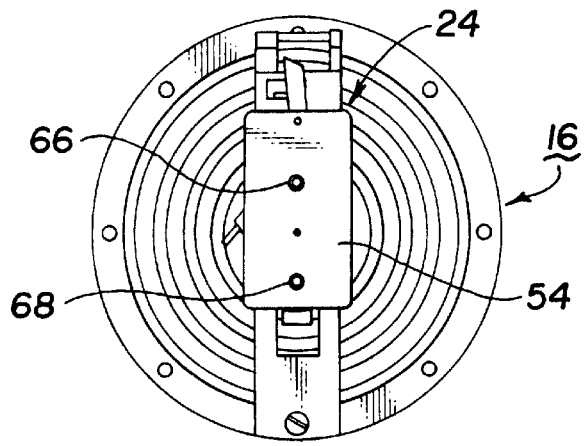
FIG. 5 is a front elevation of the gauge movement and diaphragm assembly in their initial relation.
Figure 6:
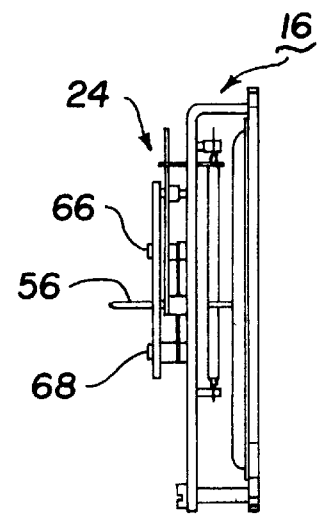
FIG. 6 is a side elevation of the gauge movement mounted on the diaphragm assembly.
Figure 7:
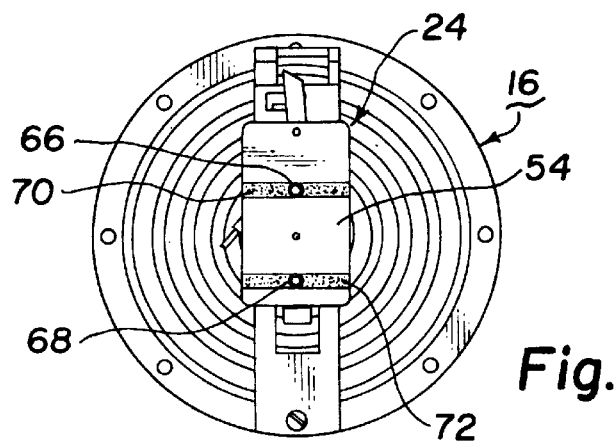
FIG. 7 is an elevation of the gauge movement similar to FIG. 5 illustrating the modifications to secure the dial plate thereon.

As seen in FIG. 2, diaphragm assembly 16 is preferably comprised of a raised front annular diaphragm 32 secured pressure-tight, as by welding, about an annular seam 34 to a rigid back plate 36. About the back plate beyond seam 34 is an annular flange containing a plurality of arcuately displaced apertures 38 for reasons as will be understood. Diaphragm 32 and rear plate 36 together define an intervening cavity 40, while an aperture 42 in back plate 36 communicates inwardly of the cavity.

As noted supra, internal cavity 14 of case 12 to which fluid pressure is received from stem 20 is communicated inward to an outlet 43. Within the flat surface 44 about outlet 43 is an oval shaped recess 46 into which a controlled quantity of sealant 48 is disposed. Positioned concentrically outward thereof are a plurality of integrally extending individual lateral posts 50 adjacent radial reenforcing fins 52. The arcuate uniform spacing of posts 50 correspond to or are a multiple of the arcuate spacing of apertures 38 in the outer flange of diaphragm plate 36.

For these purposes, posts 50 preferably are arcuately spaced at twice the angle spacing between adjacent apertures 38 such that any combination of apertures 38 can be used for selectively orienting the diaphragm to accommodate gauge positions in one of several orientations. Surrounding outlet 43, the flat oval shaped shallow recess track 46 is provided with a bead of a commercially available sealant 48, such as Loctite (TM) 5900 RTV sealant, dispensed just prior to assembly. After applying the sealant, the diaphragm assembly is mounted onto the selected combination of posts 50 until engagement is achieved between sealant 48 and the back surface 36 of the diaphragm assembly.

Once the diaphragm assembly is in position on posts 50, the posts are thermally deformed to effect a staking therebetween. This is conducted using a heat staking, thermal insertion or ultrasonic staking process for securing the diaphragm in place while at the same time compressing sealant 48. The result is a pressure seal or gasket between the enclosure and the diaphragm assembly encircling outlet 43 in communication with aperture inlet 42.

As can best be understood with reference to FIGS. 3–7, dial plate 28 includes graduations 58 and a center aperture 60 through which to receive pointer shaft 56. At symmetrical locations on the dial plate, the back surface has been partially punched or lanced so as to create forward projections and rearward recesses 62 and 64.

Contained on movement 24 is front vertical support plate 54 through which pins 66 and 68 laterally extend slightly. The centerline spacing of the pins correspond to the spacing of projections 62 and 64. The extensions of pins 66 and 68 are only slightly beyond the face plane of plate 54 and serve to receive and support the back recesses of the dial plate when mounted thereon in the correct position. Once located, two thin strips of structural adhesive 70 and 72 are placed transversely intersecting the axes of the pins so as to bond the dial plate when received to the surface of front plate 54.

With the dial plate in place, the pointer 26 is installed on pointer shaft 56, and bezel 30 is secured to the casing for enclosing the unit.

By the above description there is disclosed a novel construction for the support of the dial plate in a pressure gauge. Using only an interfit effected between the back surface of the dial plate and screw ends laterally penetrating the front face of the support plate of the gauge movement, the dial plate is supported and self aligned. Structural adhesive then bonds the dial plate to the support plate of the movement. The virtues thereof can be readily appreciated by those skilled in the art.

Since many changes could be made in the above construction and many apparently widely different embodiments of this invention could be made without departing from the scope thereof, it is intended that all matter contained in the drawings and specification shall be interpreted as illustrative and not in a limiting sense.

We claim:

1. In a pressure gauge for monitoring values of fluid pressure comprising:

a casing having an internal cavity for enclosing the operating components of the gauge and defining an exterior inlet at which fluid pressure to be monitored can be communicated through an outlet of said cavity;

a pressure sensor operably displaceable in response to changes in pressure being received;

a pointer indicator arcuately displaceable in response to displacement by said pressure sensor;

a stationary dial plate including an aperture through which to receive a shaft for supporting said pointer indicator and localized radial recesses about said aperture at predetermined spaced locations on the back surface thereof; and a stationary support plate onto which said dial plate is permanently mounted and secured and including radial projections at locations coinciding with the predetermined spaced recess locations of said dial plate to receive the back surface of said dial plate in a secured intermitting support thereon.

2. In a pressure gauge in accordance with claim 1 in which there is included a quantity of adhesive cement between the back surface of said dial plate and said support plate to effect an adhesive bonding between the support plate and the dial plate.

3. In a pressure gauge in accordance with claim 2 in which said pressure sensor comprises a diaphragm assembly, there is included a movement mechanism operatively intervening between said diaphragm assembly and said pointer and said support plate comprises a stationary plate secured to the forward end of said movement in a plane extending transverse to the axis of said pointer shaft.

4. In a pressure gauge in accordance with claim 3 in which said support plate includes parallel spaced apart and extending pins laterally forward of the face plane of said plate to comprise said projections.

5. In a pressure gauge in accordance with claim 4 in which said dial plate recesses comprise integral punch indentations extending from the backface of said dial plate to past the front face of said dial plate.

* * * * *